Patented Dec. 17, 1940

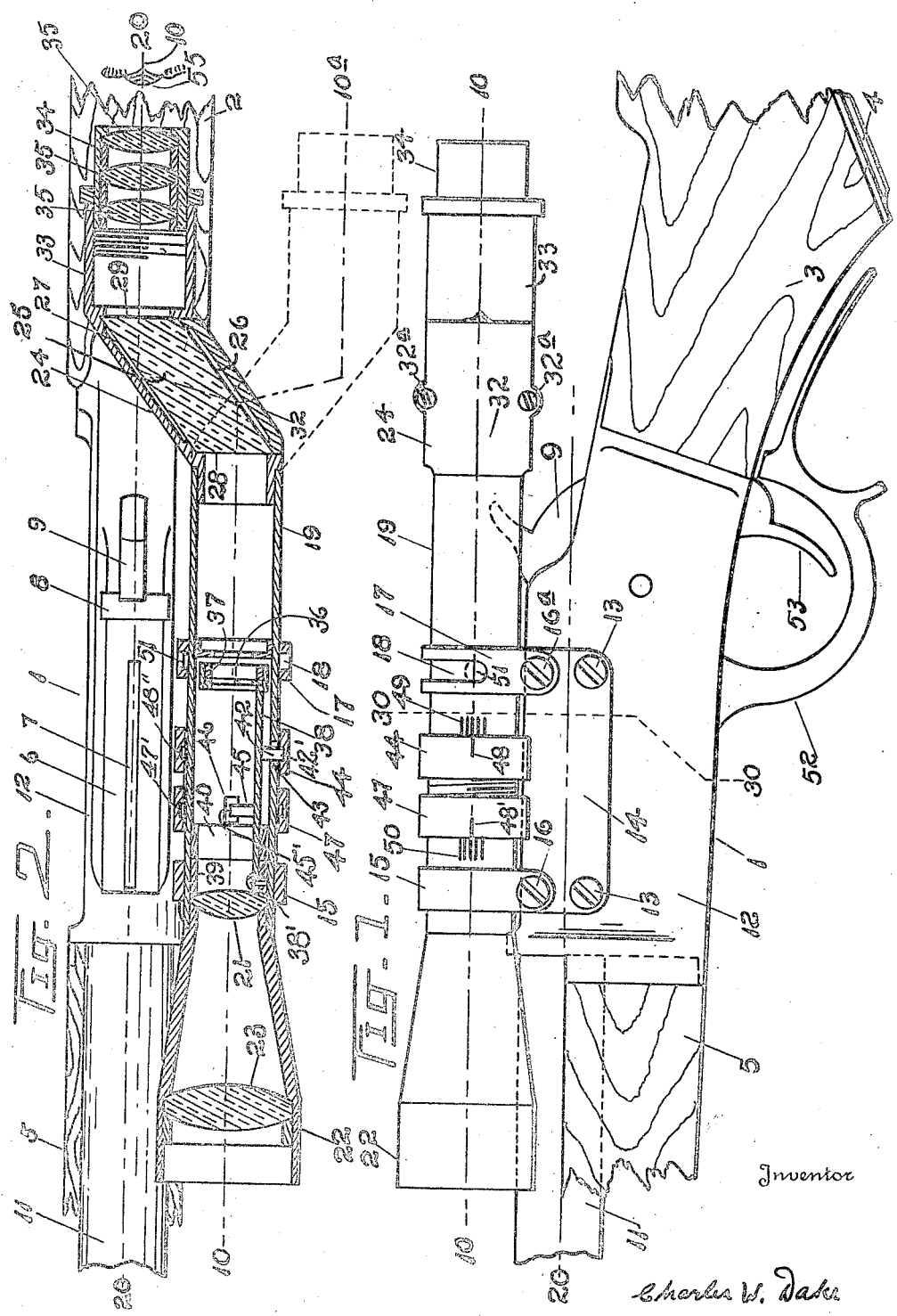
Dec. 17, 1940.  C. W. DAKE  2,225,037
TELESCOPE SIGHT FOR RIFLE FIREARMS
Filed May 20, 1937  2 Sheets-Sheet 1
Inventor
Charles W. Dake

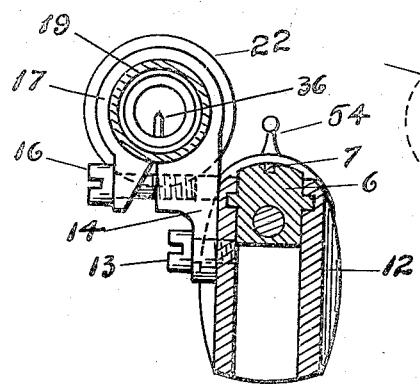
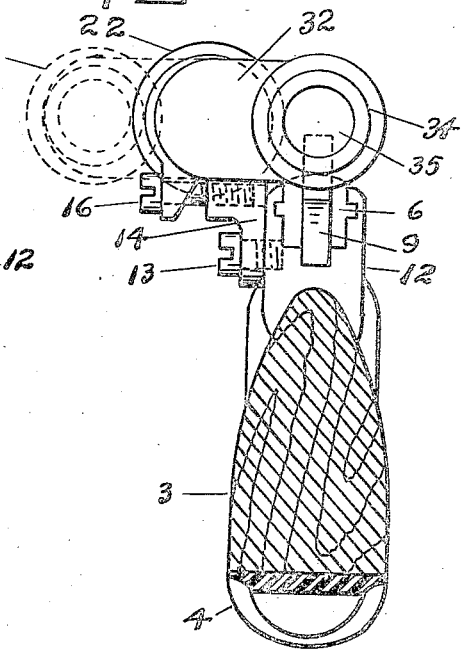
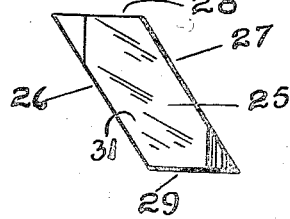
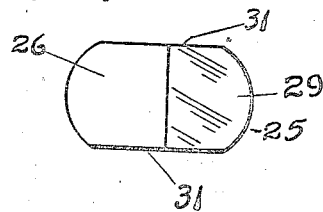

2,225,037

UNITED STATES PATENT OFFICE 2,225,037

TELESCOPE SIGHT FOR RIFLE FIREARMS

Charles W. Dake, Grand Haven, Mich.

Application May 20, 1937, Serial No. 143,780

2 Claims. (Cl. 88—33)

My present invention relates to a telescope sight for rifle firearms and particularly to a telescope sight for use on rifles whereof the cartridge case after the charge therein has been discharged, is ejected from the rifle through an opening at the top of the receiver; and the objects of my invention are, first, to provide a telescope sight in which the axis of the eye-piece will be, when sighting with the right or nearest eye to the line of sighting, substantially in alignment with the line of sight of the open sights of the rifle should the rifle be so equipped and the barrel or tube of the sight will be offset to one side of the opening at the top of the receiver sufficient to allow the cartridge case to be ejected from the receiver without obstruction; second, to provide a telescope sight that will permit a rifleman having a defective eye nearest the rifle bore, when sighting, to sight through the telescope by use of the eye farthest removed from the rifle bore; third, to provide a telescope sight that will permit the use of the open sights on a rifle without removing the telescope sight from the rifle; fourth, to provide a telescope sight in which the lateral and vertical adjustment is readily understood and accomplished; fifth, to provide a telescope sight in which the rays of light projected from the object lens are changed to coincide with the axis of the eye piece and in a simple manner; and sixth, to provide a prismatic telescope sight of cheap, rugged and efficient structure.

I attain these named objects and others that will appear from a perusal of the description of the structure disclosed in the accompanying drawings, in which:

Figure 1 is a side elevation of the middle portion of a top ejection rifle with my improved telescope sight mounted in sighting position thereon, as when the right eye of the rifleman is used in sighting.

Figure 2 is a top plan view of Fig. 1 in which the telescope sight is shown in section, thereby disclosing the lens system and sighting reticle; and by the broken lines, the eye piece as when turned to its position for sighting with the eye farthest removed from the axis of the rifle bore.

Figure 3 is a rear end view of the sight and its support as secured to the side of the receiver, including the rear of the receiver with the rifle stock shown in cross-section, as when broken and illustrated in Fig. 1.

Figure 4 is a sectional view of the sight barrel taken on irregular line 30—30 of Fig. 1 with the receiver shown in cross-section.

Figure 5 is a plan view of the prism by which the light rays projected along the axis of the sight barrel by the object lens are bent and brought to coincide with the axis of the eye piece of the telescope, and Figure 6 is an end elevation of the said prism shown in Fig. 5.

In the drawings, similar numerals refer to similar parts, and referring thereto:

Numeral 1 represents the middle portion of a top ejecting rifle having a butt stock 2 with pistol grip 3 and hard rubber grip cap 4 secured thereto; forearm 5; breach-bolt 6; provided with ejector 7; locking bolt 8 at the rear of the breach bolt; hammer 9; rifle barrel 11, and receiver 12, to which is secured as by screws 13, telescope sight mount 14 having at one of its ends sight barrel clamping strap 15 encircling the sight barrel and drawn tightly thereabout by headed screw 16. At the other end of the sight mount is sight barrel clamping strap 17, also encircling the sight barrel and drawn tightly thereabout by screws 16a. Slot 18 in the clamp strap 17 and extending slightly more than half the circumference of the clamping strap 17, together with the stop pin extending radially from the sight barrel, forms a placement stop for the sight barrel. Extending through the loops of the straps 15 and 17 is sight barrel 19 having within its forward end lens 21 and extending forward therefrom enlarged barrel portion 22 in which is mounted object lenses 23 and at the opposite end of the barrel 19, box-like section 24 in which is supported prism 25 of substantially rhomboidal form having two substantially parallel reflecting sides 26 and 27 whereby the light rays emanating from the object lens 23 are bent and projected to the lenses of the eye piece, a light receiving side 28, a light emanating side 29 and two nonactive sides 31. Cover 32 held in place by screws 32a closes the open side of the prism box-like section 24 and securely holds the prism 25 against displacement therein and also prevents the entrance of moisture or dust to the interior of the box-like section 24. Extending from the rear end of the box-like section 24 and secured thereto is eye-piece barrel portion 33 having adjustably threaded therein eye piece barrel 34 supporting the eye piece lenses 35.

Within the sight barrel 19, intermediate the lens 21, and the box-like section 24, is reticle 36 removably supported in reticle supporting ring 37, having a springable reticle support 38 secured as by rivet 38' to the interior of removable bushing 39 in the sight barrel 19 and pressed against the shoulder ring 40 secured to the interior of the sight barrel and by the lens 21 and enlarged object lens supporting portion 22, which is preferably screw-threaded into the end of the sight barrel 19. The springable reticle support 38, intermediate the reticle supporting ring 37 and the bushing 39, has lateral sight reticle adjusting pin 42 extending therefrom through hole 43 in the side wall of the sight barrel 19, where its projecting end 42' is engaged by the sides of annular groove 48'' at the inner periphery of vertical sight reticle adjustment sleeve 44 which is screw-threaded onto the exterior of the sight barrel 19, the said screw threads providing means whereby the sleeve is adjusted longitudinally of the sight barrel and the reticle is adjusted laterally thereof. The springable reticle support 38 has also vertical adjustment pin 45 integral therewith and extending through hole 46 in the bottom wall of the sight barrel 19 where its projecting end 45' is engaged by the sides of annular groove 47' at the inner periphery of the vertical sight reticle adjustment sleeve 47, which like sleeve 44 is screw-threaded onto the exterior of the sight barrel 19 whereby the sleeve 47 is adjusted longitudinally of the sight barrel and the reticle is adjusted vertically. The sleeve 44 has on its outer periphery graduation mark 48 and sleeve 47 a graduation index mark 48' whereby when taken in conjunction with graduation marks 49 and 50 on the sight barrel designate the extent of vertical or lateral adjustment of the reticle required for a given range length or wind velocity. From the foregoing description of the elements pertaining to the adjustment of the reticle for changing the line of sighting without changing the alignment of the sight barrel in relation to the bore of the rifle barrel, when the sleeve 47 is turned to screw the sleeve towards the eye piece, the springable reticle support 38 by reticle vertical adjustment pin 45 will be bent downward and the reticle will be moved toward the lower side of the sight barrel, and, when the sleeve 47 is turned to screw it toward the object lense, the springable reticle support 38 by said pin 45 will be bent toward the upper side of the sight barrel and thereby the reticle will be moved toward the upper side of the sight barrel, thereby adjusting the reticle toward either the upper or lower side of the sight barrel and thus changing the vertical sighting of the rifle. In like manner the lateral sighting is changed as by turning the sleeve 44 to screw it toward the eye piece, the springable reticle support 38 will be bent by pin 42 and the reticle will be adjusted laterally toward one side of the sight barrel; whereas by turning the sleeve 44 in the opposite direction, the springable reticle support 38 will be bent by the pin 42 in the opposite direction and the reticle will be moved toward the opposite side of the sight barrel. Thus, by turning the sight adjusting sleeves to screw them longitudinally of the sight barrel, adjustment of the reticle can be adjusted vertically for elevation or sidewise of the sight barrel to compensate for drift of the bullet in its flight caused by winds of various velocities. Fastened to the sight barrel 19 and slidable in slot 18 of sight mount strap 17 is stop pin 51 whereby the sight barrel is stopped when turned to either of its extreme opposite horizontal positions in alignment with the open sights of the rifle, or to its extreme position out of alignment with the said open sights. Hand lever 52 provides means for actuating the ejecting and reloading mechanism of the rifle, such as a repeating rifle. 53 represents the trigger which, when pressed, releases the hammer 9 actuated to strike the firing pin by a hammer spring, thereby discharging the cartridge within the chamber of the rifle barrel. 54 represents a front open sight mounted on the top of the rifle barrel 11 near its muzzle, and 55 represents the eye of a rifleman in the act of sighting either when sighting through my telescope sight or with the open sights.

Zig-zag line 10 represents the path beam of light on its passage through the several lenses comprising the lens system, the light beam direction changing and reflecting rhomboidal like prism, and the tubular barrel of the telescope, and in Fig. 1, the sighting line of open sights which are furnished on the rifle by the maker.

Line 20 represents the path of the bullet through the bore of the rifle barrel, and in Fig. 2, the sighting line of the open sights when looking down on the top of the rifle.

Heretofore, telescope sights for rifle firearms have been of a single, one-barrel, axially disposed structure from end to end in which the axis of all the lenses, including the object and eye piece lenses and the sighting reticle, were arranged along one common axis of the sight barrel, which was necessarily mounted on the rifle above the rifle's action and therefore precluded these sights use on top ejection rifles for the reason the fired cartridge shell could not be ejected from the top of the receiver; and, further, required the entire telescope sight to be removed from the rifle when it was desired to use the open sights as furnished by the manufacturer of rifles; or, required mounting the telescope sight so far above the line of the open sights, that the sighting could be done under the telescope sight barrel. This method of mounting required that a raised comb be added to the butt stock of the rifle in order that the eye of the shooter be raised to alignment with the axis of the eye piece of the telescope sight and that required the removal of the raised comb when it was desired to use the open sights. Besides, if the stock fitted the shooter for one sight, it gave either too much or too little drop of stock for the use of the sight system. Further, the top mounting could only be used on side ejection rifles unless it were mounted very high above the receiver, because the barrel of the sight necessarily directly over the top opening of the receiver interfered with or prevented the ejection of the fired cartridge case and at times caused clogging of the rifle's action. Therefore, side mounting in some cases was resorted to in order that the telescope sight could be employed on top ejecting rifles. This had an objection, in that the comb had to be provided with a thickened cheek pad in order that the eye of the rifleman be supported in alignment with the eye piece of the sight. This prevented the use of open sights, and necessitated a bent stock to bring the butt thereof in proper position against the shooter's shoulder for receiving the recoil. It thereby increased the apparent recoil of the rifle, but not in alignment with the rifle bore. It resulted in the rifle's being swung by the recoil towards the side the rifle barrel is offset, all of which prevents accurate shootinng.

In the use of my improved telescope sight, all of the above named objections are eliminated. The position of the shooter's eye, when the butt stock is once fitted to the shooter, is supported directly back of the eye piece and in alignment with its axis; and when the eye piece is swung over out of the way as for using the open sights, the eye is in the same position and in alignment with and for using the said open sights as it was for using the telescope sight. Thus, there is no change of stock necessary or dismounting of the telescope sight, other than the loosening of the clamping screws 16 and 16a which releases the grip of the clamping straps 15 and 17 about the sight barrel and a turning of the sight barrel to a position that will bring the axis of the eye piece in alignment with the alignment of the open sights, or to its position farthest removed from said alignment, in which position the telescope sight can be used with the eye farthest from the rifle barrel bore and the open sights used with the eye nearest the rifle barrel bore; or both eyes can be used at one and the same time, one with the open sights and the other with the telescope sight and the cartridge case can be ejected from the top opening of the rifle's receiver in top ejecting rifles without obstruction or interference with the telescope sight.

Referring particularly to the path of light forming the image of the target to be sighted or shot at, the light rays are gathered by the object lens 23 and projected thereby back through lens 21, past the reticle 36 to the prism 25 in which they encounter the reflecting surface at the prism side 26, which is inclined to the axis of the light rays projected and where they are bent and projected through the prism, which is of high grade optical glass, to the reflecting surface at the opposite side 27 of the same prism, which again bends the light rays and projects them to the lenses of the eye piece. Thus, it will be seen that the path of light forming the image projected is a zig-zag path, as at one portion of its path the light rays travel parallel to the axis of the rifle barrel bore in sidewise spaced apart relation thereto, then through the prism 25 in inclined relation to the first named path and then parallel to the first named path, but in spaced apart relation thereto with the axis of the light bundle in alignment with the sighting line of the open sights on the rifle barrel.

As in all rifle firearms sighting is painstaking and fine, adjustment must be made for sighting in the rifle for elevation when shooting different range distances and also laterally for allowance of bullet drift due to difference in wind velocities. In my telescope sight a reticle is provided which is adjusted or moved either laterally or vertically to compensate for these necessary variables, as by turning the sleeves 44 or 47, encircle the telescope sight barrel and screw-threaded on the exterior of the said sight barrel upon which graduation marks are provided to show the amount of adjustment of the reticle made for either elevation or windage. The sleeves 44 and 47 each have at their inner periphery an annular groove the sides of which engage pins 42 and 45 integral with the springable reticle support and extending through the sight barrel from the springable reticle support of which they are a part. The pin 42 extends from the springable reticle support through the bottom wall of the sight barrel and into the groove 47' so that by turning the sleeve 44 the sleeve is adjusted longitudinally along the sight barrel and bends the springable reticle support either to move the reticle for near or distant shooting. The pin 45 by turning the sleeve 47 screws the sleeve also longitudinally along the sight barrel and through the pin 45 bends the springable reticle support for lateral and wind adjustment.

Having described my improved telescope sight for rifle firearms, I claim as my invention:

1. In a telescope sight for rifle firearms having a rifled barrel, a telescope sight mount attached thereto, the said telescope sight mount having a loop in sidewise spaced apart relation to a plane extending vertically through the axis of the rifled barrel, a sight barrel mounted for partial rotation in said loop and having in its forward end an object lens, an eye piece barrel in transverse spaced apart relation to the axis of the sight barrel and so related to the axis of the sight barrel that the axis of the eye piece may be rotated into the above-mentioned plane above the axis of the rifled barrel, a prism support connecting the said sight and eye piece barrels, and a reflecting prism mounted in the support, said prism being of such length that the axis of the light rays emanating from the object lens will be projected axially through the eye piece.

2. A telescope sight for rifle firearms having a rifled barrel with a receiver, a telescope sight mount attached thereto, the said mount having a loop for engaging and rotatably supporting a telescope sight barrel provided with an object lens, the said telescope sight barrel comprising an elongated tube supported in said loop of said mount and extending parallel to a plane extending vertically through the axis of said rifled barrel in spaced apart relation thereto, and having therein a sight reticle carried by a springable support having extending therefrom through the wall of the sight barrel a pin-like extension engaged by a sleeve screw-threaded on the exterior of the sight barrel and bending the springable reticle support to move the reticle vertically, and a second pin-like extension engaging a second sleeve screw-threaded on the exterior of the sight barrel for bending the springable reticle support to move the reticle horizontally, an adjustable eye piece extending rearwardly parallel to and in transverse spaced apart relation to the axis of the sight barrel, and a hollow prism housing connecting the said eye piece barrel and the said sight barrel and a prism having reflecting surfaces mounted on said housing, the said prism having a length such that the axis of the light rays projected into the sight barrel by the object lens will be projected by the prism axially through the eye piece.

CHARLES W. DAKE.